United States Patent
Elkatatny et al.

(10) Patent No.: US 11,414,589 B2
(45) Date of Patent: Aug. 16, 2022

(54) METHOD OF REMOVING CALCIUM CARBONATE-CONTAINING OIL-BASED FILTER CAKE USING A BIODEGRADABLE ACID SOLUTION

(71) Applicant: KING FAHD UNIVERSITY OF PETROLEUM AND MINERALS, Dhahran (SA)

(72) Inventors: Salaheldin Elkatatny, Dhahran (SA); Abdelmjeed Mohamed, Dhahran (SA); Salem Basfer, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/749,418

(22) Filed: Jan. 22, 2020

(65) Prior Publication Data

US 2021/0222050 A1 Jul. 22, 2021

(51) Int. Cl.
  E21B 37/00 (2006.01)
  C09K 8/528 (2006.01)
  E21B 21/00 (2006.01)

(52) U.S. Cl.
  CPC ............ C09K 8/528 (2013.01); E21B 37/00 (2013.01); *E21B 21/003* (2013.01)

(58) Field of Classification Search
  CPC ........ C09K 8/528; E21B 37/00; E21B 21/003
  See application file for complete search history.

(56) References Cited

U.S. PATENT DOCUMENTS

| 5,909,774 A | 6/1999 | Griffith et al. |
| 6,631,764 B2 | 10/2003 | Parlar et al. |
| (Continued) | | |

FOREIGN PATENT DOCUMENTS

| CN | 108841364 A | 11/2018 | |
| WO | WO 2013/160334 A1 | 10/2013 | |
| WO | WO-2016032578 A1 * | 3/2016 | ............ C09K 8/035 |

OTHER PUBLICATIONS

G.R. Coulter, et al., "A Contemporary Approach To Matrix Acidizing", Society of Petroleum Engineers, SPE Annual Technical Conference and Exhibition, 1997, 2 pages (Abstract only).

(Continued)

*Primary Examiner* — Silvana C Runyan
(74) *Attorney, Agent, or Firm* — Oblon, McClelland, Maier & Neustadt, L.L.P.

(57) ABSTRACT

A method of removing calcium carbonate-containing oil-based filter cake from a wellbore involving contacting the calcium carbonate-containing oil-based filter cake with a biodegradable acid solution of water, hydrochloric acid, formic acid, citric acid, a surfactant, and a glycol ether mutual solvent. The method is performed at a pressure of 200 to 400 psi and a temperature of 50 to 125° C. The method removes calcium carbonate-containing oil-based filter cake made of a water-in-oil emulsion, calcium carbonate, a primary emulsifier, a secondary emulsifier, a contamination treatment agent, a viscosity control agent, a filtration control agent. The method meets industry standard steel corrosion rates of less than 0.049 lb/ft$^2$ per day. Also disclosed is a biodegradable acid solution of water, hydrochloric acid, formic acid, citric acid, a surfactant, and a glycol ether mutual solvent that meets OECD 301B thresholds for ready biodegradability.

14 Claims, 2 Drawing Sheets

(56) References Cited

U.S. PATENT DOCUMENTS

| | | |
|---|---|---|
| 7,380,602 B2 | 6/2008 | Brady et al. |
| 2009/0114394 A1 | 5/2009 | Javora et al. |
| 2015/0107832 A1* | 4/2015 | DeWolf .................. C10G 33/02 |
| | | 166/266 |
| 2017/0088763 A1* | 3/2017 | Sui .......................... E21B 37/06 |
| 2017/0198192 A1* | 7/2017 | Panamarathupalayam ................. |
| | | C09K 8/035 |
| 2018/0037792 A1* | 2/2018 | Champagne ........... C09K 8/035 |

OTHER PUBLICATIONS

Mohamed Mahmoud, et al., "Towards a Complete Removal of Barite Weighted Water and Oil Based-Drilling Fluids in Single Stage", Society of Petroleum Engineers, SPE Annual Technical Conference and Exhibition, 2017, 2 pages (Abstract only).

Salaheldin Elkatatny, et al., "Investigating the Compatibility of Enzyme with Chelating Agents for Calcium Carbonate Filter Cake Removal", Arabian Journal for Science and Engineering, vol. 43, Issue 5, May 2018, pp. 2309-2318 (Abstract only).

* cited by examiner

METHOD OF REMOVING CALCIUM CARBONATE-CONTAINING OIL-BASED FILTER CAKE USING A BIODEGRADABLE ACID SOLUTION

BACKGROUND OF THE INVENTION

Technical Field

The present invention relates to a method of removing calcium carbonate-containing oil-based filter cake using a biodegradable acid solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids are mixtures of several suspended and dissolved solids and liquids. Solids are present as discontinuous phases spread on the liquid (continuous) phase. The liquid could be water in cases of water-based drilling fluids (WBDF) or oil in cases of oil-based drilling fluids (OBDF). During drilling operations, the drilling fluids must achieve different objectives including lubrication of the drill bit and drill string [Gordon, C., et. al., 2008, AADE Fluids Conference and Exhibition, AADE-08-DF-HO-09], transfer of the drilled cuttings to the surface while drilling and suspension of these cuttings when drilling is stopped [Fink, J. K., 2012. Petroleum engineer's guide to oil field chemicals and fluids. Waltham, Mass.: Gulf Professional Pub], preventing formation fluids from invading the wellbore hole, and ensuring wellbore stability by creating a low permeability film on the borehole's wall under an overbalance condition called filter cake [Bourgoyne Jr., A. T., et. al., 1986, Applied Drilling Engineering; Rabia, H., 2001. Well Engineering and Construction. Entrac Consulting; and Hossain, M., and Al-Majed, A. A., 2015. Fundamentals of Sustainable Drilling Engineering. John Wiley & Sons].

In order for the drilling mud to prevent blowout and suppress the formation pressure, the drilling mud formulation usually involves a weighting material such as barite, hematite, manganese tetroxide, calcium carbonate, potassium formate, which is added to the drilling fluid to obtain the desired density [Rugang, Y., et. al., 2014, Powder Technology, 262, 51-61]. Consequently, these high-weight additives are the main source for most formation damage related problems, especially in the producing zones, and have a considerable effect on the filter cake composition.

Figure 1A:
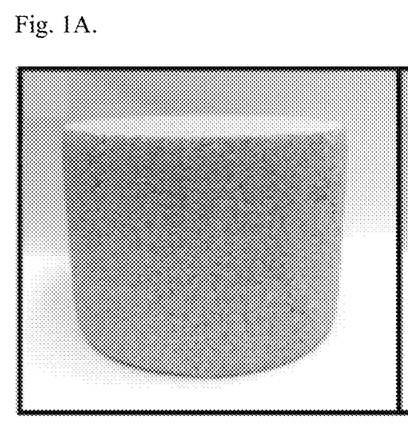
FIG. 1A shows the limestone core used before filter cake deposition.
Figure 1B:
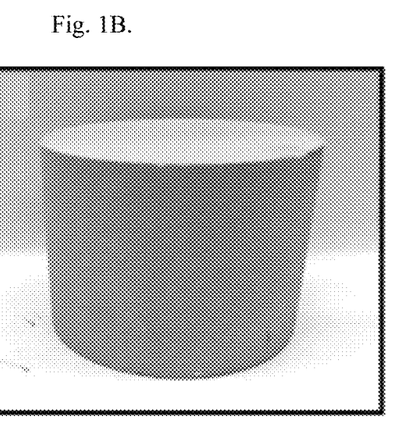
FIG. 1B shows the sandstone core used before filter cake deposition.

Filter cake is an impermeable thin layer with a permeability from 0.01 to 0.0001 and [Hanssen, J. E., et. al., 1999, SPE International Symposium on Oilfield Chemistry, SPE 50709-MS] which forms over the face of the permeable formation [Civan, F., 1994, Society of Petroleum Engineers International Petroleum Conference and Exhibition of Mexico] as shown in FIG. 1. Formation of the filter cake is required to stabilize the drilled formations, minimize the drilling fluids filtration into the drilled formations [Ba Geri, B. S., et. al., 2015, International Petroleum Technology Conference, IPTC; and Ba Geri, B. S., et. al., 2016, Journal of Energy Resources Technology, 138, 3, 32901], and reduce solid particle invasion into the oil-bearing formations [Ba Geri, B., et. al., 2013, SPE Middle East Unconventional Gas Conference & Exhibition]. However, after the drilling operation, the drilling fluids and the filter cake must be removed from the wellbore before the start of production operations to enable a successful primary cement job and to prevent impeding of the flow of oil at the wellbore [Fink, J., 2015, Petroleum Engineer's Guide to Oil Field Chemicals and Fluids, Second Edition, Gulf Professional Publishing, Chapter 9, 299-316].

Pre-flush fluids are fluids specially designed to be injected after drilling and before injection of the cement slurry in order to thoroughly remove the remaining mud from the annular space [McDonald, M., et. al., 2014, AADE Fluids Technical Conference and Exhibition, AADE-14-FTCE-55]. These fluids are designed to be efficient in cleaning the drilling mud, be chemically compatible with drilling mud and cement slurry, be able to prevent sludge or emulsion formation, and be able to correct the formation rock wettability in some cases [Quintero, L., et. al., 2008, AADE Fluids Conference and Exhibition, AADE-08-DF-HO-01]. Some pre-flush fluids may also be designed to remove filter cake.

Filter cake removal is a complicated task since the filter cake layer has different structural characteristics for different drilling fluid types (i.e. water-based or oil-based drilling fluids) and different drilling fluid additives [Rugang, Y., et. al., 2014, Powder Technology, 262, 51-61]. Oil-based mud is a common drilling fluid that is formed using an oil or a water-in-oil emulsion (also called inverse emulsion) [Vickers, S., et. al, 2011, SPE European Formation Damage Conference, SPE 144798]. The presence of the oil or water-in-oil emulsion gives filter cakes formed from oil-based drilling fluids properties that make the removal of oil-based filter cakes different from water-based filter cakes. For example, Davidson, et al. [Davidson, E., et. al., 2006, SPE/IADC Indian Drilling Technology Conference and Exhibition, SPE 101964] illustrated that the wettability of the bridging material in the filter cake should be altered from oil wet to water wet and in addition the oily film surrounding the bridging material should be removed to have a direct contact between an acid component of a filter cake removal solution and the weighting material of the filter cake.

Safaniya and Khafji Saudi Arabia reservoirs are usually drilled using inverse-emulsion drilling fluid to control sand production. Al-Anzi et al. [Al-Anzi, N., et. al., 2009, SPE Formation Damage Conference, SPE 122327] stated that the inverse-emulsion filter cake can be uniformly removed using a delayed filter cake breaker. Leschi et al. [Leschi, P., et. al., 2006, SPE International Symposium and Exhibition on Formation Damage Control, SPE 98164] developed a delayed filter cake breaker in which an organic acid precursor (OAP) was the main component, in addition to water wetting additives. Zubail et al. [Zubail, M. A., et. al., 2012, SPE Kuwait International Petroleum Conference and Exhibition, SPE 163357] also used an organic acid precursor (OAP) and a water wetting additive to remove the inverse-emulsion filter cake after drilling horizontal wells in Safaniya Offshore Field in Saudi Arabia. They concluded that the delayed filter cake breaker which contains OAP and water wetting agents had a uniform distribution in the horizontal section and the breaker was able to remove the filter cake completely. The authors also stated that one of the main disadvantages of this system is the release of acid which can cause corrosion of the screen and the pipes.

Another method for removing oil-based filter cakes involves the use of microemulsions in the removal fluid. Like conventional emulsions, microemulsions contain small droplets of a liquid dispersed in a different liquid. In microemulsions, the average droplet size of the microemulsion is of 10 to 100 nm, which is much smaller than conventional emulsions. Typically, microemulsions consist of several phases separated by a monolayer of surfactant. In addition, microemulsion is macroscopically homogeneous and microscopically heterogeneous. One such microemulsion is a very stable homogeneous fluid which was formulated by adding alcohol to surfactant stabilized oil-in-water emulsions. [Quintero, L., et. al., 2005, European Formation Damage Conference, SPE 94604].

Al-Otaibi et al. [Al-Otaibi, M. A., et. al., 2010, SPE International Symposium and Exhibition on Formation Damage Control, SPE 127795] developed a single stage removal fluid for oil-based filter cake in horizontal wells comprising a microemulsion. They concluded that single phase microemulsion fluid was able to remove the invert-emulsion drill-in fluid filter cake with a high efficiency of 97% in 24 hrs soaking. They stated that the single phase microemulsion was compatible with the invert-emulsion drilling fluid.

Quintero et al. [Quintero, L., et. al., 2011, SPE European Formation Damage Conference, SPE 144209] stated that microemulsion can be used to remove the filter cake of synthetic and oil-based filter cakes in open hole completions. Brege et al. [Brege, J., et. al., 2012, North Africa Technology Conference and Exhibition, SPE 150237] assessed the use of microemulsion technology to remove near well-bore damage with an oil-based drilling fluid and oil-based filter cake. They stated that the main advantages of microemulsion fluids are reduction in the interfacial tension to near zero, high diffusion coefficient and high oil solubilization.

Kumar et al. [Kumar V. A., et. al., 2016, SPE International Conference & Exhibition on Formation Damage Control, SPE 178942] used single-phase microemulsion fluid where surfactant(s) and co-surfactants were used to co-solubilize oil and water. The authors concluded that micro-emulsion fluids were able to effectively remove synthetic and oil-based filter cake and the near-wellbore damage.

There are many factors affecting the behavior of the micro-emulsion phase such as; oil type, co-surfactant, surfactant, salinity, and temperature. In addition, because no two oil wells are identical, the microemulsion must be specially-designed for each well and the performance of the microemulsion fluid tested in a laboratory before using in the field. This need to tailor the identities and relative amounts of the components of the microemulsion fluid to each well presents a large hurdle to the widespread use of microemulsion fluids for oil-based filter cake removal.

In view of the foregoing, one objective of the present invention is to provide an efficient, microemulsion-free, method for the removal of a calcium carbonate-containing oil-based filter cake using a biodegradable acid solution. The method achieves high removal efficiency while leaving geological formations undamaged and surpassing industry requirements for low steel corrosion rate. Another objective is to provide a biodegradable acid solution for the removal of calcium carbonate-containing oil-based filter cake. The solution meets OECD 301B requirements for ready biodegradability.

BRIEF SUMMARY OF THE INVENTION

According to a first aspect, the present disclosure relates to a method for removing a calcium carbonate-containing oil-based filter cake from a wellbore, the method comprising contacting the calcium carbonate-containing oil-based filter cake with a biodegradable acid solution comprising 61.75 to 92.74 wt % of water, 5.0 to 20.0 wt % of hydrochloric acid, 0.75 to 5.0 wt % of formic acid, 0.75 to 5.0 wt % of citric acid, 0.75 to 7.5 wt % of a glycol ether mutual solvent, 0.01 to 0.75 wt % of a surfactant, each based on a total weight of the biodegradable acid solution, wherein the biodegradable acid solution is contacted with the calcium carbonate-containing oil-based filter cake at a pressure of 200 to 400 psi, and wherein the calcium carbonate-containing oil-based filter cake comprises petroleum or refined petroleum, and calcium carbonate.

In some embodiments, the calcium carbonate-containing oil-based filter cake further comprises water.

In some embodiments, the water is present in the form of a water-in-oil emulsion.

In some embodiments, the water is present in the water-in-oil emulsion in an amount of 10 to 40 wt % based on a total weight of the calcium carbonate-containing oil-based filter cake.

In some embodiments, the biodegradable acid solution has a density of 0.85 to 1.25 g/cm$^3$ at 20 to 30° C.

In some embodiments, the biodegradable acid solution has a viscosity of 1.3 to 1.6 cP at 20 to 30° C.

In some embodiments, the biodegradable acid solution has a surface tension of 30 to 34 mN/m at 20 to 30° C.

In some embodiments, biodegradable acid solution has a pH of −1.5 to −1.1 at 20 to 30° C.

In some embodiments, the contacting is performed at a temperature of 50 to 125° C.

In some embodiments, the contacting is performed for 1 to 48 hours.

In some embodiments, the method removes the calcium carbonate-containing oil-based filter cake while causing a corrosion rate of steel of less than 0.049 lb/ft$^2$ per day at 50 to 125° C.

In some embodiments, a volume ratio of the biodegradable acid solution to the calcium carbonate-containing oil-based filter cake being contacted is 5:1 to 75:1.

In some embodiments, greater than 92.5% of a volume of the calcium carbonate-containing oil-based filter cake is removed.

In some embodiments, the method restores 97.5 to 125% of an initial permeability to a geological formation material occluded by calcium carbonate-containing oil-based filter cake, wherein the initial permeability is the permeability of the geological formation material before occlusion with calcium carbonate-containing oil-based filter cake.

In some embodiments, the biodegradable acid solution reaches a plateau of 75 to 99% of theoretical $CO_2$ by day 40 according to OECD 301B biodegradation test.

In some embodiments, the glycol ether mutual solvent comprises ethylene glycol monobutyl ether.

The present disclosure also relates to a biodegradable acid solution comprising 61.75 to 92.74 wt % of water, 5.0 to 20.0 wt % of hydrochloric acid, 0.75 to 5.0 wt % of formic acid, 0.75 to 5.0 wt % of citric acid, 0.75 to 7.5 wt % of a glycol ether mutual solvent, and 0.01 to 0.75 wt % of a surfactant, each based on a total weight of the biodegradable acid solution.

In some embodiments, the biodegradable acid solution has a density of 0.85 to 1.25 g/cm$^3$ at 20 to 30° C., a viscosity of 1.3 to 1.6 cP at 20 to 30° C., a surface tension of 30 to 34 mN/m at 20 to 30° C., and a pH of −1.5 to −1.1 at 20 to 30° C.

In some embodiments, the glycol ether mutual solvent comprises ethylene glycol monobutyl ether.

In some embodiments, the biodegradable acid solution has a steel corrosion at a rate of less than 0.049 lb/ft$^2$ per day at 50 to 125° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

According to a first aspect, the present disclosure relates to a method for removing a calcium carbonate-containing oil-based filter cake from a wellbore. The method involves contacting the calcium carbonate-containing oil-based filter cake with a biodegradable acid solution.

Biodegradable Acid Solution

The biodegradable acid solution comprises, consists essentially of, or consists of, hydrochloric acid, formic acid, citric acid, a surfactant, a glycol ether mutual solvent, and water. In some embodiments, the hydrochloric acid is present in an amount of 5 to 20 wt %, preferably 5 to 17.5 wt %, preferably 7.5 to 15 wt %, preferably 8 to 12.5 wt %, preferably 9 to 11 wt %, preferably 9.5 to 10.5 wt %, preferably 10 wt % based on a total weight of the biodegradable acid solution. In some embodiments, the formic acid is present in an amount of 0.75 to 7.5 wt %, preferably 0.9 to 6 wt %, preferably 1 to 5 wt %, preferably 1.1 to 3.5 wt %, preferably 1.25 to 3 wt %, preferably 1.4 to 2.75 wt %, preferably 1.5 to 2.5 wt % based on a total weight of the biodegradable acid solution. In some embodiments, the citric acid is present in an amount of 0.75 to 7.5 wt %, preferably 0.9 to 6 wt %, preferably 1 to 5 wt %, preferably 1.1 to 3.5 wt %, preferably 1.25 to 3 wt %, preferably 1.4 to 2.75 wt %, preferably 1.5 to 2.5 wt % based on a total weight of the biodegradable acid solution.

In some embodiments, a weight ratio of the formic acid to the citric acid present in the biodegradable acid solution is 10:1 to 1:10, preferably 7:1 to 1:7, preferably 5:1 to 1:5, preferably 3.2:1 to 1:3.2, preferably 2.5:1 to 1:2.5, preferably 2:1 to 1:2, preferably 1.5:1 to 1:1.5, preferably 1.25:1 to 1:1.25, preferably 1:1. While other acids may be used, preferably they are not. Examples of other acids which may be used include acetic acid, propionic acid, hydrobromic acid, hydroiodic acid, chloric acid, perchloric acid, sulfuric acid, sulfurous acid, and phosphoric acid. Certain other acids, however, may not be used. Examples of other acids that may not be used include hydrofluoric acid, silicic acid, orthosilicic acid, fluorosilicic acid, and hexafluorophosphoric acids.

A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl)dimethylammonio]-1-propanesulfonate), cocamidopropyl hydroxysultaine, cocamidopropyl betaine, phospholipids, sultaine and sultaine derivatives, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3-(CH_2)_{10-16}-(O-C_2H_4)_{1-25}-OH$, such as octaethylene glycol monododecyl ether and pentaethylene glycol monododecyl ether; polypropylene glycol alkyl ethers having the formula: $CH_3-(CH_2)_{10-16}-(O-C_3H_6)_{1-25}-OH$; glucoside alkyl ethers having the formula $CH_3-(CH_2)_{10-16}-(O\text{-glucoside})_{1-3}\text{-}OH$, such as decyl glucoside, lauryl glucoside, octyl glucoside; polyethylene glycol octylphenyl ethers having the formula $C_8H_{17}-(C_6H_4)-(O-C_2H_4)_{1-25}-OH$, such as Triton X-100; polyethylene glycol alkylphenyl ethers having the formula $C_9H_{19}-(C_6H_4)-(O-C_2H_4)_{1-25}-OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the surfactant is an ionic surfactant. In some embodiments, the ionic surfactant is an anionic surfactant. In some embodiments, the anionic surfactant is sodium dodecyl sulfate.

In some embodiments, the surfactant is present in an amount of 0.0075 to 0.75 wt %, preferably 0.01 wt % to 0.7 wt %, preferably 0.05 to 0.65 wt %, preferably 0.075 to 0.50 wt %, preferably 0.1 to 0.4 wt %, preferably 0.15 to 0.35 wt %, preferably 0.175 to 0.325 wt %, preferably 0.2 to 0.3 wt %, preferably 0.225 to 0.275 wt %, preferably 0.25 wt % based on a total weight of biodegradable acid solution.

A glycol ether is a solvent comprising alkyl ethers of glycols. Typically, the glycol portion is ethylene glycol or propylene glycol, though other glycols are used as well. The alkyl ether group may be present on one or both of the hydroxyl groups of the glycol. In the case where the alkyl ether groups are present on both of the hydroxyl groups of the glycol, the alkyl groups attached to the glycol may be the same or they may be different. Examples of glycol ethers include ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dibutyl ether, diethylene glycol monomethyl ether, diethylene glycol dimethyl ether, propylene glycol monomethyl ether, propylene glycol monoethyl ether, propylene glycol monopropyl ether, propylene glycol monobutyl ether, propylene glycol dimethyl ether, propylene glycol diethyl ether, propylene glycol dibutyl ether. Such glycol ethers find use as mutual solvents. A mutual solvent is a solvent that is added to a liquid to increase the solubility of an immiscible phase in said liquid. Mutual solvents may be used to increase the solubility of oil or a water-in-oil emulsion in an aqueous solution. In some embodiments, the glycol ether mutual solvent is present in an amount of 0.75 to 7.5 wt %, preferably 1.5 to 7 wt %, preferably 3 to 6.5 wt %, preferably 4 to 6 wt %, preferably 4.5 to 5.5 wt %, preferably 5 wt % based on a total weight of biodegradable acid solution. In some embodiments, the glycol ether mutual solvent is ethylene glycol monobutyl ether.

In some embodiments, the water is present in an amount of 61.75 to 92.74 wt %, preferably 63 to 90 wt %, preferably 65 to 88 wt %, preferably 67 to 86 wt %, preferably 69 to 85 wt %, preferably 70 to 84 wt %, preferably 73 to 83 wt %, preferably 75 to 81 wt %, preferably 77.75 to 79.75 wt % based on a total weight of the biodegradable acid solution.

In some embodiments, the biodegradable acid solution is substantially free of a chelating agent. Examples of chelating agents include glutamic acid N,N-di-acetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine-N,N',N'-triacetic acid or a salt thereof (HEDTA).

In some embodiments, the biodegradable acid solution has a density of 0.85 to 1.25 $g/cm^3$, preferably 0.86 to 1.24 $g/cm^3$, preferably 0.87 to 1.23 $g/cm^3$, preferably 0.88 to 1.22 $g/cm^3$, preferably 0.89 to 1.21 $g/cm^3$, preferably 0.90 to 1.20 $g/cm^3$, preferably 0.91 to 1.19 $g/cm^3$, preferably 0.92 to 1.18 $g/cm^3$, preferably 0.93 to 1.17 $g/cm^3$, preferably 0.94 to 1.16 $g/cm^3$, preferably 0.95 to 1.15 $g/cm^3$, preferably 0.96 to 1.14 $g/cm^3$, preferably 0.97 to 1.13 $g/cm^3$, preferably 0.98 to 1.12, preferably 0.99 to 1.11 $g/cm^3$, preferably 1.00 to 1.10 $g/cm^3$ at 20 to 30° C., preferably 22.5 to 27.5° C., preferably 23 to 27° C., preferably 25° C. In some embodiments, the biodegradable acid solution has a viscosity of 1.3 to 1.6 cP, preferably 1.35 to 1.55 cP, preferably 1.36 to 1.54 cP, preferably 1.37 to 1.53 cP, preferably 1.37 to 1.52 cP, preferably 1.39 to 1.51 cP, preferably 1.40 to 1.50 cP, preferably 1.45 to 1.49 cP, preferably 1.46 to 1.48 cP at 20 to 30° C., preferably 22.5 to 27.5° C., preferably 23 to 27° C., preferably 25° C. In some embodiments, the biodegradable acid solution has a surface tension of 30 to 34 mN/m, preferably 30.25 to 33.75 mN/m, preferably 30.5 to 33.5 mN/m, preferably 30.75 to 33.25 mN/m, preferably 31 to 33 mN/m, preferably 31.25 to 32.75 mN/m, preferably 31.5 to 32.5 mN/m, preferably 31.75 to 32.75 mN/m, preferably 32 mN/m at 20 to 30° C., preferably 22.5 to 27.5° C., preferably 23 to 27° C., preferably 25° C. In some embodiments, the biodegradable acid solution has a pH of −1.5 to −1.1, preferably −1.45 to −1.15, preferably −1.4 to −1.2, preferably −1.35 to −1.22, preferably −1.32 to −1.25, preferably −1.31 to −1.27, preferably −1.30 to −1.28, preferably −1.29 20 to 30° C., preferably 22.5 to 27.5° C., preferably 23 to 27° C., preferably 25° C.

In some embodiments, the biodegradable acid solution may be formed by adding and mixing components that comprise the biodegradable acid solution in any order, and then continuing to mix until a stable, uniform mixture is formed. In one embodiment, the biodegradable acid solution may be formed by starting with a solvent, such as water, brine, seawater, or freshwater, adding a component, mixing to uniformity, and then repeating for the remaining steps. Alternatively, two or more components may be added at a time and mixed, and in one embodiment, the biodegradable acid solution may be heated while mixing, for example, to a temperature of 110 to 200° F., preferably 150 to 180° F., in order to more quickly dissolve certain components. The mixing may be performed by flowing through or across a static mixer, or with a turbine, blade, impeller, drum mixer, stir bar, paddle, or through some other form of agitation or blending.

Method for Removing Calcium carbonate-containing Oil-Based Filter Cake

Filter cake refers to solid residue that is deposited in a wellbore after drilling. Filter cake comprises solid material present in drilling fluid. Filter cake, also called mud cake, mudcake, and wall cake, is typically classified as either water-based filter cake or oil-based filter cake, depending on the composition of the drilling fluid the filter cake is derived from. Water-based filter cakes are derived from water-based drilling fluids that do not contain an oil or emulsion phase. Oil-based filter cakes are derived from oil-based drilling fluids that typically contain both oil and water or both oil and an emulsion phase. Examples of components of oil-based drilling fluids are particulate inorganic materials, aluminosilicates, clays, alkalinity control agents, filter cake stabilizing agents, viscosity control agents, fluid loss control agents, oxygen scavengers such as sulfite salts or bisulfite salts, foam control agents, filtration control agents, contamination treatment agents, emulsifiers, and an oil, petroleum, or refined petroleum-based water-in-oil emulsion. These components may be present in a filter cake derived from the oil-based drilling fluid. Examples of particulate inorganic materials are calcium sulfate, calcium carbonate, barium sulfate, iron (II, III) oxide ($Fe_3O_4$), iron (III) oxide ($Fe_2O_3$), manganese (IV) oxide ($MnO_2$), and manganese (II, III) oxide ($Mn_3O_4$). Examples of aluminosilicates are andalusite, kyanite, sillimanite, zeolites, kaolinite, and mullite. Examples of clays are bentonite, montmorillonite, illite, chlorite, and smectite. Examples of alkalinity control agents include potassium hydroxide, sodium hydroxide, ammonium hydroxide, and lithium hydroxide. Examples of filter stabilizing agents include calcium chloride, lithium chloride, sodium chloride, potassium chloride, potassium acetate, and potassium formate. Examples of viscosity control agents are synthetic polymers such as polyacrylates, polyacrylamides, and polyalphaolefins, celluloses such as cellulose, carboxymethylcellulose, and sulphoethylcellulose, natural gums such as xantham gum and guar gum, and organophillic clays such as Geltone® available from Halliburton and comprising fatty acid amines and crystalline silica, and Rheoboost® available from Halliburton and comprising fatty acids. Examples of fluid loss control agents include starches, chemically modified starches, and copolymers such as AMPS-acrylamide, styrene-butadiene rubber, and acrylamide/acrylic acid. These copolymers may be block copolymers, gradient copolymers, random copolymers, alternating copolymers, or graft copolymers. Examples of filtration control agents include Polypac® available from Schlumberger and comprising a polyanionic cellulose polymer, Versatrol® available from Schlumberger and comprising an asphalt resin, Novatec® available from Schlumberger and comprising a maleated rosin polymer and glycol ether, and Duratone® available from Halliburton and comprising a modified lignitic product. Examples of contamination treatment agents include lime, gypsum, zinc, copper, and iron. Examples of emulsifiers include Invermul® available from Halliburton and comprising fatty acid amides and glycol ethers, EZ-Mul® available from Halliburton and comprising fatty acid amides, petroleum distillate, and glycol ethers, CyberMul® available from Newpark and comprising an environmentally acceptable liquid blend of organic acids, and VersaMul® available from Schlumberger and comprising a liquid blend of selected emulsifiers, wetting agents, gelling agents, fluid stabilizers, and mineral oil. Examples of the petroleum or refined petroleum base in the water-in-oil emulsion include crude oil, gasoline, and diesel.

In some embodiments, the calcium carbonate-containing filter cake is an oil-based filter cake. In some embodiments, the calcium carbonate-containing oil-based filter cake is derived from an oil-based drilling fluid comprising calcium carbonate, a filter-cake stabilizing agent, a primary emulsifier, a secondary emulsifier, a contamination treatment agent, a viscosity control agent, a filtration control agent, petroleum or refined petroleum, and water. In some embodiments, the calcium carbonate-containing oil-based filter cake comprises petroleum or refined petroleum and calcium carbonate. In some embodiments, the oil-based filter cake further comprises a filter-cake stabilizing agent, a primary emulsifier, a secondary emulsifier, a contamination treatment agent, a viscosity control agent, and a filtration control agent. In some embodiments, calcium carbonate is present in an amount of 10 to 95 wt %, preferably 15 to 90 wt %, preferably 25 to 87.5 wt %, preferably 35 to 85 wt %, preferably 45 to 82.5 wt % based on a total weight of the calcium carbonate-containing oil-based filter cake on a dry basis. In some embodiments, the remaining wt % of the total weight of the calcium carbonate-containing oil-based filter cake comprises a filter cake stabilizing agent, a primary emulsifier, a secondary emulsifier, a contamination treatment agent, a viscosity control agent, a filtration control agent, petroleum or refined petroleum, and water. In some embodiments, the water is present as a water-in-oil emulsion comprising petroleum or refined petroleum and water. In some embodiments, the petroleum or refined petroleum is diesel. In some embodiments, water is present in the water-in-oil emulsion in an amount of 10 to 40 wt %, preferably 15 to 35 wt %, preferably 20 to 30 wt %, preferably 22.5 to 27.5 wt %, preferably 24 to 26 wt %, preferably 25 wt %, based on a total weight of the water-in-oil emulsion.

In some embodiments, the calcium carbonate-containing oil-based filter cake has a mean thickness of 0.5 to 10 mm, preferably 0.6 to 9 mm, preferably 0.75 to 8 mm, preferably 1 to 7 mm, preferably 1.25 to 6 mm, preferably 1.5 to 5 mm, preferably 1.75 to 4 mm, preferably 2 to 3.5 mm.

In some embodiments, the method comprises contacting the calcium carbonate-containing oil-based filter cake with a biodegradable acid solution as described above. In some embodiments, the method consists essentially of said contacting. The method excludes contacting the calcium carbonate-containing oil-based filter cake with a substance or solution that causes the petroleum or refined petroleum or the water-in-oil emulsion to be removed from the filter cake without also removing the calcium carbonate. The method also excludes contacting the calcium carbonate-containing oil-based filter cake with a substance or solution that causes the water-in-oil emulsion to be disrupted or "break", a situation in which the emulsion is converted from a single phase to two separate phases, without also removing the calcium carbonate. Methods that involve removing the petroleum, refined petroleum, or water-in-oil emulsion or breaking the water-in-oil emulsion without removing the calcium carbonate, then contacting the remaining material of the filter cake with a substance or solution to remove the calcium carbonate and other material of the filter cake are known as "two-step" or "two-stage" methods. The method of the current disclosure is a "one-step" or "one-stage" method because both the petroleum, refined petroleum, or water-in-oil emulsion and the calcium carbonate and other material of the oil-based filter cake are removed by a single contacting step.

In some embodiments, the contacting is performed at a pressure of 200 to 400 psi, preferably 210 to 390 psi, preferably 220 to 380 psi, preferably 230 to 370 psi, preferably 240 to 360 psi, preferably 250 to 350 psi, preferably 260 to 340 psi, preferably 270 to 330 psi, preferably 280 to 320 psi, preferably 290 to 310 psi, preferably 300 psi. In some embodiments, the contacting is performed at a temperature of 50 to 125° C., preferably 60 to 120° C., preferably 70 to 115° C., preferably 80 to 110° C., preferably 90 to 105° C., preferably 95 to 102.5° C., preferably 100° C. In some embodiments, the contacting is performed for 1 to 48 hours, preferably 4 to 44 hours, preferably 8 to 40 hours, preferably 12 to 36 hours, preferably 14 to 34 hours, preferably 16 to 32 hours, preferably 18 to 30 hours, preferably 19 to 24 hours, preferably 20 hours.

In some embodiments, a volume ratio of the biodegradable acid solution to the calcium carbonate-containing oil-based filter cake being contacted is 5:1 to 50:1, preferably 7.5:1 to 45:1, preferably 10:1 to 40:1, preferably 12.5:1 to 35:1, preferably 15:1 to 30:1, preferably 17.5:1 to 25:1, preferably 19:1 to 22.5:1, preferably 20:1. In some embodiments, greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99% of a volume of the calcium carbonate-containing oil-based filter cake is removed by the method.

In some embodiments, the method restores 97.5 to 125%, preferably 98 to 124.5%, preferably 98.5 to 124%, preferably 99 to 123.5%, preferably 99.5 to 123%, preferably 99.9 to 122.5%, preferably 100 to 122% of an initial permeability to a geological formation material occluded by calcium carbonate-containing oil-based filter cake, wherein the initial permeability is the permeability of the geological formation material before occlusion with calcium carbonate-containing oil-based filter cake.

In some embodiments, the method removes the calcium carbonate-containing oil-based filter cake while simultaneously stimulating the geological formation. Such stimulation may be detected by measuring the porosity of the geological formation or geological formation material before occlusion by the calcium carbonate-containing oil-based filter cake, then measuring the porosity after removal of the calcium carbonate-containing oil-based filter cake. A porosity after removal of the calcium carbonate-containing oil-based filter cake that is higher than the porosity before occlusion by the calcium carbonate-containing oil-based filter cake indicates that stimulation has occurred. In some embodiments, the porosity after removal of the calcium carbonate-containing oil-based filter cake that is approximately equal to than the porosity before occlusion by the calcium carbonate-containing oil-based filter cake. In some embodiments, the porosity after removal of the calcium carbonate-containing oil-based filter cake that is 0 to 50% greater than, preferably 1 to 40% greater than, preferably 2 to 30% greater than, preferably 3 to 22% greater than the porosity before occlusion by the calcium carbonate-containing oil-based filter cake. Because the contacting of the method both removes the calcium carbonate-containing oil-based filter cake and stimulating the porous geological formation, the method may be considered a one-step filter cake removal and reservoir stimulating method.

In some embodiments, the calcium carbonate-containing oil-based filter cake is removed by dissolving. Dissolving a calcium carbonate-containing oil-based filter cake, as described here, means that the calcium carbonate-containing oil-based filter cake may break apart, partially or completely dissolve, disperse, or disintegrate from a surface of a wellbore or other porous surface or from a portion of a calcium carbonate-containing oil-based filter cake. A method to dissolve a calcium carbonate-containing oil-based filter cake may be considered a "treatment," or a method of "treating" or "removing" a calcium carbonate-containing oil-based filter cake from a surface. In some embodiments, the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. In some embodiments, the dissolving and removing of a calcium carbonate-containing oil-based filter cake as described by the method is a result of the components of the biodegradable acid solution reacting with different compounds within the calcium carbonate-containing oil-based filter cake, as previously described. In some embodiments, the dissolving and removing may also result from the physical turbulence or flow of fluids against the calcium carbonate-containing oil-based filter cake, or by diffusion of a fluid into a calcium carbonate-containing oil-based filter cake or between a calcium carbonate-containing oil-based filter cake and the surface.

In practice, the method of removing a calcium carbonate-containing oil-based filter cake from a wellbore can be applied in various ways. For example, the biodegradable acid solution can be injected into the wellbore to dissolve the calcium carbonate-containing oil-based filter cake within. Alternatively, the biodegradable acid solution can be injected directly at the site of a calcium carbonate-containing oil-based filter cake. Alternatively, the biodegradable acid solution can be allowed to circulate in the wellbore for a certain period of time. Alternatively, the biodegradable acid solution may be left in the wellbore to soak the calcium carbonate-containing oil-based filter cake. Alternatively, the wellbore containing the calcium carbonate-containing oil-based filter cake may be pre-washed by water and/or mutual solvent and/or pretreated with a surfactant before being treated with the biodegradable acid solution, as long as said treatment does not remove the petroleum, refined petroleum, or water-in-oil emulsion or break the water-in-oil emulsion without removing the calcium carbonate and other materials of the filter-cake. In some embodiments, the biodegradable acid solution is used in a diluted form. In some embodiments, the biodegradable acid solution is diluted with water. In some embodiments, the biodegradable acid solution is diluted with a glycol ether mutual solvent. In alternative embodiments, the biodegradable acid solution is not used in a diluted form.

The method of the present disclosure is applicable in numerous different environments. It can be used to remove calcium carbonate-containing oil-based filter cake produced from drilling, production, completion, workover, or stimulation activity, either produced intentionally or unintentionally. It can be used in screen-only completions or gravel pack completions, an open hole or a cased hole, vertical or highly deviated wells. The biodegradable acid solution may be used as single-application soak or circulating fluid in which the biodegradable acid solution also serves as a carrier fluid for, e.g., a gravel pack operation; in conjunction with a gelling agent or viscoelastic surfactant (e.g., ClearFRAC™ available from Schlumberger and comprising a mixture of viscoelastic surfactants and potassium chloride but excluding polymer surfactants) or alone, with a variety of clean-up tools and other fluid additives (e.g., anti-corrosive agents) or dissolution components. Since the problem of placement and uniform dissolution are present in virtually every instance, the biodegradable acid solution and method of the present disclosure are readily applicable to any scenario in which it is desirable to remove a calcium carbonate-containing oil-based filter cake from a wellbore or near-wellbore region in a geological formation such as the wellbore face, pores in the geological formation, or natural or artificial fractures in the geological formation, regardless of whether the calcium carbonate-containing oil-based filter cake is produced during drilling or during other post-drilling operations (e.g., fluid-loss control pill, gravel pack operation, fracturing, matrix acidizing, and so forth).

Following the contacting, in some embodiments, the method may further comprise a step of flushing away a dispersed calcium carbonate-containing oil-based filter cake with a low concentration of organic or non-organic acid as commonly known in the art to increase permeability.

Filter cake removal methods must not be overly damaging to the material of a geological formation or the material of the wellbore, production pipe, or other equipment associated with oil extraction. One standardized way of quantifying such damage is too measure the corrosion rate of steel under conditions used in the filter cake removal method. Various test standards and protocols have been developed for determining the corrosion rate. A standard benchmark is that the method causes a corrosion rate of steel less than 0.05 $lb/ft^2$ of exposed steel per day under the conditions of the method. In some embodiments, the method removes the calcium carbonate-containing oil-based filter cake while causing a corrosion rate of steel less than 0.049 $lb/ft^2$ per day, preferably less than 0.045 $lb/ft^2$ per day, preferably less than 0.040 $lb/ft^2$ per day, preferably less than 0.038 $lb/ft^2$ per day, preferably less than 0.036 $lb/ft^2$ per day, preferably less than 0.034 $lb/ft^2$ per day, preferably less than 0.032 $lb/ft^2$ per day at a temperature of 50 to 125° C., preferably 60 to 120° C., preferably 70 to 115° C., preferably 80 to 110° C., preferably 90 to 105° C., preferably 95 to 102.5° C., preferably 100° C.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength. More preferably, the physical properties and chemical composition of the carbon steel are suitable for application in subterranean formations, including elevated temperatures and pressures, flow of gases, fluids and solids and the presence of corrosive gases. Preferred carbon steels are carbon steels wherein at least one of manganese or chromium is present in an amount of 0.75 wt % in relation to the total steel alloy weight. These carbon steels include, but are not limited to, N-80, L-80, P-110, Q-125, J-55, C-75, C-90, C-95, QT-800, QT-900, 5LX-42, and 5LX-52 carbon steels.

In one embodiment the steel is low-carbon steel, which contains up to 0.30 wt % carbon with respect to a total weight of the steel alloy. The carbon content for high-formability steels is less than 0.10 wt % of carbon, with up to 0.4 wt % manganese with respect to a total weight of the steel alloy. For rolled steel structural plates and sections, the carbon content may be increased to approximately 0.30 wt %, with higher manganese content up to 1.5 wt %. These materials may be used for stampings, forgings, seamless tubes, and boiler plates.

In another embodiment the steel is medium-carbon steel, with medium-carbon steels being similar to low-carbon steels except that the carbon content ranges from 0.30 to 0.60 wt % and the manganese content ranges from 0.60 to 1.65 wt % with respect to a total weight of the steel alloy.

In yet another embodiment the steel is a high-carbon steel, with high-carbon steels containing from 0.60 to 1.00 wt % of carbon with manganese contents ranging from 0.30 to 0.90 wt % with respect to a total weight of the steel alloy.

In another embodiment the steel is an ultrahigh-carbon steel, with ultrahigh-carbon steels being experimental alloys containing 1.25 to 2.0 wt % carbon with respect to a total weight of the steel alloy.

One metric by which an acid solution may be considered environmentally-friendly is to be biodegradable. A standard method of determining biodegradability is the OCED 301B biodegradation test. This test inoculates a biodegradation solution containing the substances or solution to be tested with a microorganism and incubates the biodegradation solution in the dark or diffuse light. The amount of carbon dioxide produced is measured and compared to a calculated amount of carbon dioxide called the "theoretical $CO_2$". In order to be designated readily biodegradable, 70% of dissolved oxygen content is removed from the biodegradation solution and 60% of theoretical $CO_2$ is produced. In some embodiments, the biodegradable acid solution reaches a plateau of 75 to 99%, preferably 77.5 to 95%, preferably 79 to 90%, preferably 80 to 87.5% of theoretical $CO_2$ by day 40 according to OECD 301B biodegradation test.

The examples below are intended to further illustrate protocols for preparing the biodegradable acid solution and removing a calcium carbonate-containing filter cake using the biodegradable acid solution and are not intended to limit the scope of the claims. Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

Example 1

Material

An inverted emulsion drilling fluid was prepared which contains 0.6 bbl of diesel as the continuous phase and 0.17 bbl of water as the dispersed phase, calcium carbonate (30 g) as a weighting material, Invermul® available from Halliburton and comprising fatty acid amides and glycol ethers (6 g) as a primary emulsifier, EZ-Mul® available from Halliburton and comprising fatty acid amides, petroleum distillate as a secondary emulsifier (3 g), lime (8 g) for contamination treatment, Geltone II® available from Halliburton and comprising fatty acid amines and crystalline silica (9 g) for viscosity control, and Duratone HT® available from Halliburton and comprising a modified lignitic product (8 g) for filtration control.

The drilling fluid has a plastic viscosity of 37.5 cP and yield point of 30 lb/100 ft$^2$ while the gel strength was 17 lb/100 ft$^2$ at 10 sec, 20 lb/100 ft$^2$ at 10 min, and 23 lb/100 ft$^2$ at 30 min. the increase of the gel strength value from 10 minutes to 30 minutes was small indicating the flat rheology of the drilling fluid. The flat rheology of the gel strength is very important as it will decrease the required pressure required to break the gel strength.

TABLE 1

| The drilling fluid formula | |
|---|---|
| Additive | Quantity |
| Diesel, bbl (0.6) | 210 ml |
| INVERMUL NT ®, | 6 g |
| EZ-MUL NT ® | 3 g |
| LIME, | 8 g |
| Water, bbl (0.17) | 59.5 ml |
| $CaCl_2$ | 44 g |
| GELTONE II ® | 9 g |
| DURATONE HT ® | 8 g |
| $CaCO_3$ | 30 g |

Mutual solvent (Ethylene Glycol Mono Butyl Ether ($C_6H_{14}O_2$)) was obtained from a service company. The green biodegradable acid system (GBAS) was composed of hydrochloric acid (HCl) in an amount of 10 wt. %, formic acid in an amount of 1.5-2.5 wt. %, citric acid in an amount of 1.5-2.5 wt. %, mutual solvent in an amount of 5 wt % and sodium dodecyl sulfate in an amount of less than 0.5 wt. %. The remaining weight of the GBAS is deionized water (80 to 82 wt. %). GBAS is a green acid solution synthesized by a catalytic-reagent combination added to HCl creating a biodegradable acid system. GBAS achieved a plateau of 81% using theoretical carbon dioxide evaluation (ThCO2) measurement by day 40 exceeding the requirements for Ready Biodegradability.

Different core samples were used to simulate the reservoir condition. Indiana limestone core (2.5" in diameter) with an average diesel permeability of 166.6 mD and average porosity of 14.77%. Berea sandstone core (2.5" in diameter) with an average permeability of 133.6 mD and an average porosity of 17.9%. Table 2 lists the complete properties of the used cores.

TABLE 2

| Core sample properties | | |
|---|---|---|
| Type | Limestone | Sandstone |
| Length, in | 1.793 | 1.983 |
| Diameter, in | 2.5 | 2.5 |
| Permeability with diesel, mD | 166.6 | 133.6 |
| Porosity, % | 14.78 | 17.90 |

Example 2

Experimental Procedure

The following procedure was applied to evaluate the using of the GBAS to remove the oil-based calcium carbonate filter cake:
1. The drilling fluid was prepared and mixed under ambient conditions.
2. The fluid rheology was determined at 120° F. and 14.7 psi room pressure.

3. Computability and thermal stability of the GBAS was performed for 24 hrs at 212° F.
4. Corrosion test was performed for the GBAS for 6 hrs at 212° F. and 300 psi.
5. Density, viscosity and surface tension was measure for the GBAS at ambient temperature.
6. Filtration test was performed using 2.5" core for 30 minute at 212° F. and 300 psi differential pressure.
7. Removal process was perfumed using 200 cm$^3$ of the GBAS.

Example 3

GBAS Properties

The GBAS solution has a density of 1.05 g/cm$^3$, viscosity of 1.47 cP, and surface tension of 32 dynes/cm. these properties were measured at room temperature. The corrosion rate was 0.03 lb/ft$^2$ under 212° F. for 6 hrs using actual steel coupon. The acid mixture was computable under room temperature and the see-through cell was used to see the thermal stability and computability under 212° F. for 24 hrs and it was noted that there was no change in the fluid and there is evidence of cloud formation.

Example 4

Filtration Operation

The drilling fluid was purred in the high pressure high temperature cell which contained an actual core with 2.5" diameter and around 2" length. FIGS. 1A and 1B show the cores before the filtration test, where FIG. 1A is the limestone core and FIG. 1B is the sandstone core.

Figure 2:
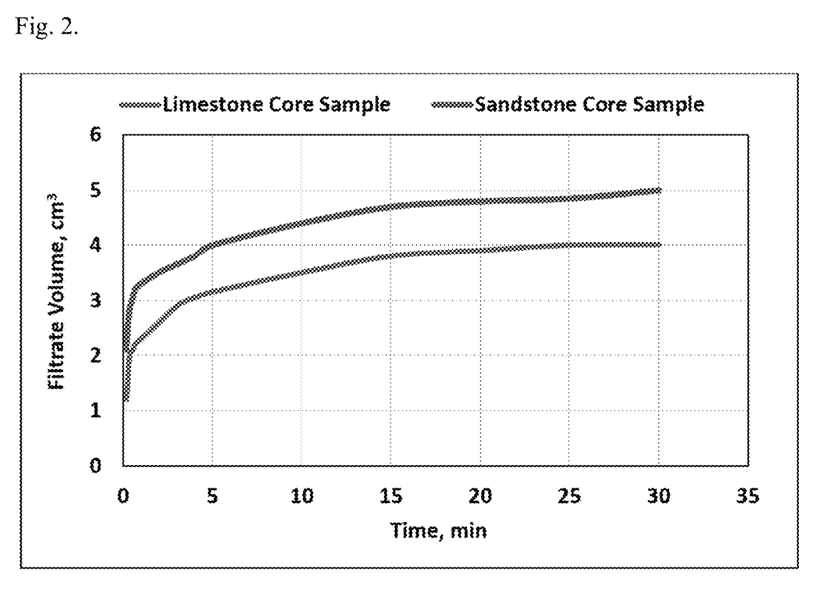
FIG. 2 shows a plot of filter cake volume as function of time deposited on the cores.
Figure 3A:
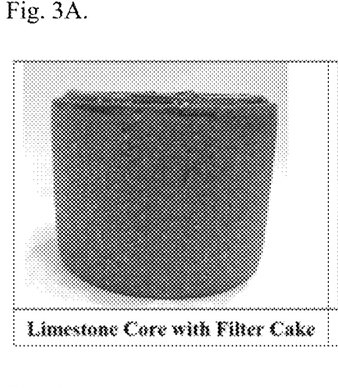
FIG. 3A shows the limestone core with deposited oil-based filter cake.
Figure 3B:
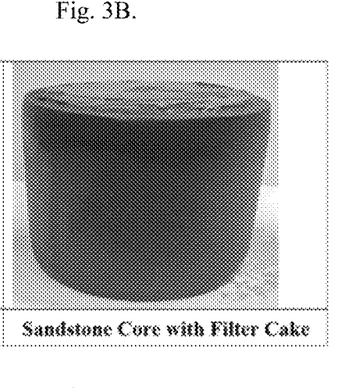
FIG. 3B shows the sandstone core with deposited oil-based filter cake.

The filtration process was performed at 212° F. for 30 minutes and 300 psi was used as a differential pressure to push the fluid to invade the core. FIG. 2 shows that the filtrate fluid was almost 5 cm$^3$ after 30 minute for sandstone core while for limestone core the filtrate volume was 4 cm$^3$. FIGS. 3A and 3B shows the used cores with the formed filter cake, where FIG. 3A is the limestone core and FIG. 3B is the sandstone core. The filter cake thickness was 2 mm for limestone core and it was 1.3 mm for sandstone core.

Example 5

Filter Cake Removal and Retained Permeability Calculations

Figure 4A:
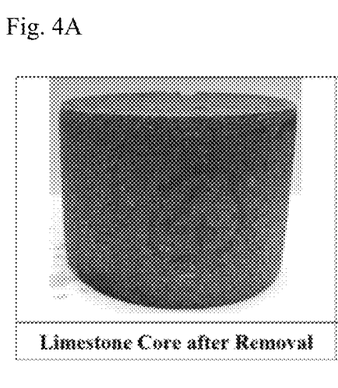
FIG. 4A shows the limestone core with oil-based filter cake removed via the method.
Figure 4B:
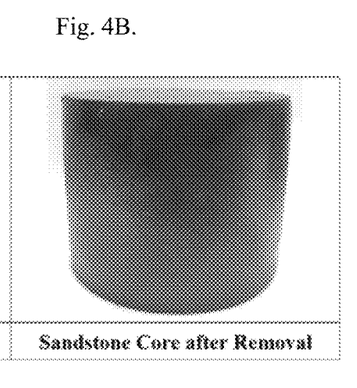
FIG. 4B shows the sandstone core with oil-based filter cake removed via the method.

The removal process was conducted at 212° F. using 200 cm$^3$ of GBAS. FIGS. 4A and 4B show that the filter cake was completely removed after 24 hrs of soaking with GBAS for both limestone (FIG. 4A) and sandstone (FIG. 4B) cores. These results confirmed the 100% removal of the external filter cake. To evaluate the removal of the internal filter cake or the damage after the filtration, the return permeability should be calculated.

Figure 5:
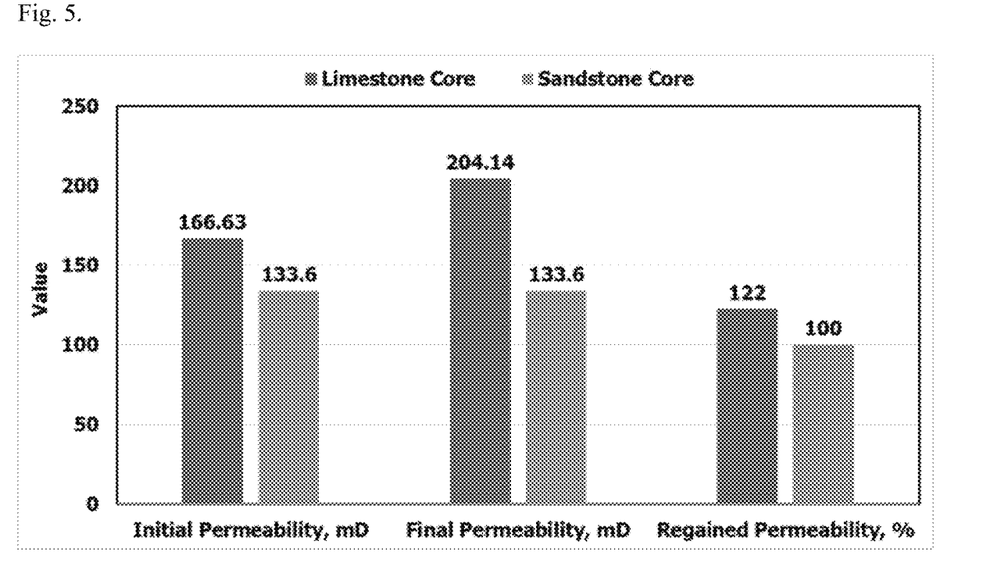
FIG. 5 shows the permeability of the cores before filter cake deposition, with oil-based filter cake, and after filter cake removal.

The initial and final permeability was calculated using diesel at room temperature. The final permeability of the sandstone core was 133.6 mD which is the same as the initial permeability before the filtration indicating complete removal of the internal damage after the removal process and the retained permeability was 100%. For the limestone core, the initial permeability was 166.3 mD while the final permeability was 204.14 mD indicating stimulation of the core with the GBAS where the retained permeability was 122.5%, FIG. 5. These results confirmed that the developed solution was able to stimulate the core after removing the filter cake completely in 24 hrs at 212° F.

The invention claimed is:

1. A method for removing a calcium carbonate-containing oil-based filter cake from a wellbore face or geological formation material, the method comprising:
   contacting the calcium carbonate-containing oil-based filter cake with a biodegradable acid solution comprising:
   61.75 to 92.74 wt % of water,
   5.0 to 20.0 wt % of hydrochloric acid,
   0.75 to 5.0 wt % of formic acid,
   0.75 to 5.0 wt % of citric acid,
   0.75 to 7.5 wt % of a glycol ether mutual solvent,
   0.01 to 0.75 wt % of a surfactant, each based on a total weight of the biodegradable acid solution,
   wherein the biodegradable acid solution is contacted with the calcium carbonate-containing oil-based filter cake at a pressure of 200 to 400 psi,
   wherein the calcium carbonate-containing oil-based filter cake comprises petroleum or refined petroleum, and calcium carbonate, and
   wherein a volume ratio of the biodegradable acid solution to the calcium carbonate-containing oil-based filter cake being contacted is 5:1 to 75:1.

2. The method of claim 1, wherein the calcium carbonate-containing oil-based filter cake further comprises water.

3. The method of claim 2, wherein the water is present in the form of a water-in-oil emulsion.

4. The method of claim 3, wherein the water is present in the water-in-oil emulsion in an amount of 10 to 40 wt % based on a total weight of the water-in-oil emulsion.

5. The method of claim 1, wherein the biodegradable acid solution has a density of 0.85 to 1.20 g/cm$^3$ at 20 to 30° C.

6. The method of claim 1, wherein the biodegradable acid solution has a viscosity of 1.3 to 1.6 cP at 20 to 30° C.

7. The method of claim 1, wherein the biodegradable acid solution has a surface tension of 30 to 34 mN/m at 20 to 30° C.

8. The method of claim 1, wherein the biodegradable acid solution has a pH of −1.5 to −1.1 at 20 to 30° C.

9. The method of claim 1, wherein the contacting is performed at a temperature of 50 to 125° C.

10. The method of claim 1, wherein the contacting is performed for 1 to 48 hours.

11. The method of claim 1, wherein the method removes the calcium carbonate-containing oil-based filter cake while causing a corrosion rate of steel of less than 0.049 lb/ft$^2$ per day at 50 to 125° C.

12. The method of claim 1, wherein greater than 92.5% of a volume of the calcium carbonate-containing oil-based filter cake is removed.

13. The method of claim 1, wherein the method restores 97.5 to 125% of an initial permeability to a geological formation material occluded by calcium carbonate-containing oil-based filter cake, wherein the initial permeability is the permeability of the geological formation material before occlusion with calcium carbonate-containing oil-based filter cake.

14. The method of claim 1, wherein the glycol ether mutual solvent comprises ethylene glycol monobutyl ether.

* * * * *